Jan. 6, 1953     B. T. VIRTUE     2,624,645
FRACTURED OUTER RACE FOR ANTIFRICTION BEARINGS
Filed May 3, 1951
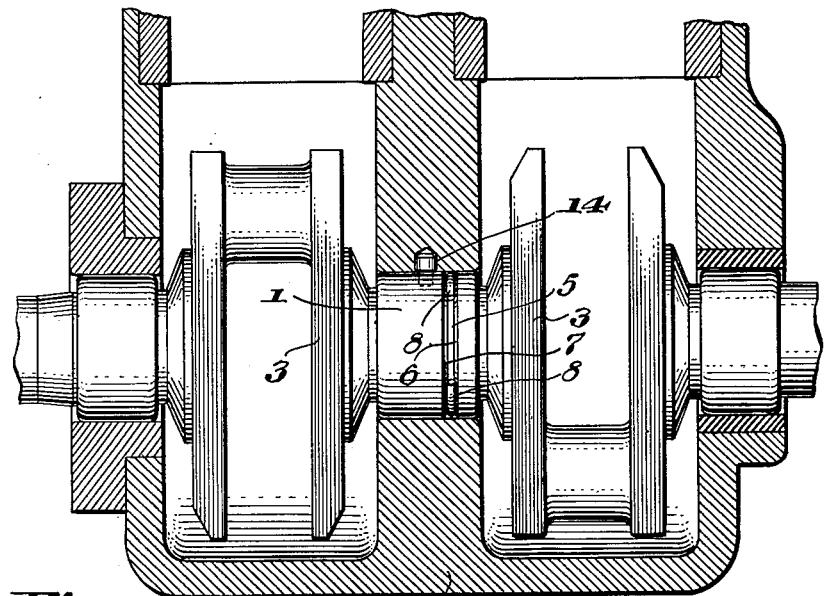
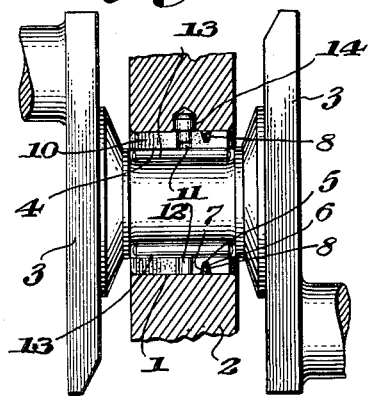
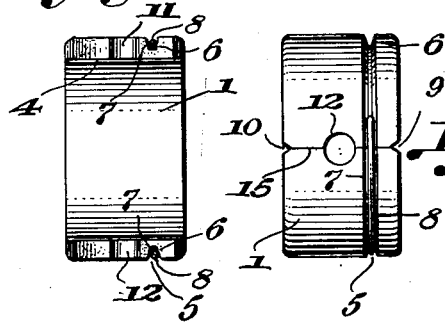
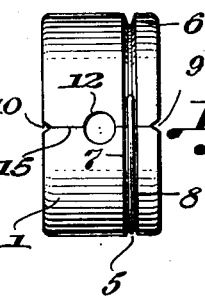
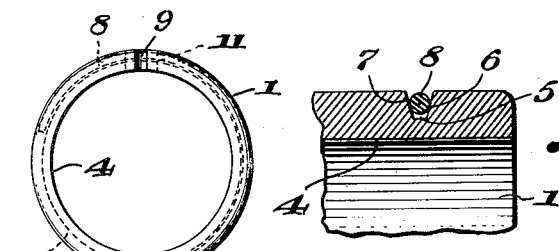
INVENTOR
Byron T. Virtue
BY Mason, Porter, Diller & Stewart
ATTORNEYS Patented Jan. 6, 1953

2,624,645

UNITED STATES PATENT OFFICE 2,624,645

FRACTURED OUTER RACE FOR ANTIFRICTION BEARINGS

Byron T. Virtue, Litchfield, Conn., assignor to The Torrington Company, Torrington, Conn., a corporation of Maine Application May 3, 1951, Serial No. 224,403

2 Claims. (Cl. 308—216)

The invention relates to new and useful improvements in anti-friction bearings and more particularly to the outer race of a bearing for a crank shaft at points intermediate the crank arms.

An object of the invention is to provide a bearing race formed in sections by fracturing the same longitudinally thereof in a substantially diametrical plane wherein the fractured race is provided with means for maintaining the sections thereof in axial alignment and in mating contact.

A further object of the invention is to provide a bearing race of the above type with means whereby the fractured sections, if separated, can with assurance be reassembled so that the fractured surfaces will mate.

A still further object of the invention is to provide an anti-friction bearing of the above type with a circumferential groove, the walls of which taper inwardly, and a split ring dimensioned so as to contact the tapered walls of the groove and thus hold the fractured sections in axial alignment.

These and other objects will in part be obvious and will in part be hereinafter more fully disclosed.

In the drawings which show by way of illustration one embodiment of the invention:

Figure 1 is a vertical sectional view through the crankcase of a two cylinder engine showing the improved bearing as employed for supporting the crank shaft at a point intermediate the crank arms;

Figure 2 is a view in vertical section through the crank shaft, bearing race, and a portion of the crankcase;

Figure 3 is a sectional view through the race before it is fractured;

Figure 4 is a side elevation of the race with the split ring positioned in the groove and after the race has been fractured;

Figure 5 is an end view of the race; and

Figure 6 is an enlarged longitudinal sectional view of a portion of the race.

In the present illustrated embodiment of the invention the improved race is shown as employed in connection with the central crank shaft supporting bearing of a two cylinder engine. It is to be understood, however, that the improved race may be used as a bearing for any type of rotating shaft where by reason of its associated parts it is impossible to place the bearing by a movement endwise along the shaft.

In the present illustrated embodiment of the invention the improved bearing race indicated at 1 is mounted in the crankcase 2 between the crank arms 3, 3 of the crank shaft. The improved race as shown in Figures 3, 4 and 5 is cylindrical in form. The race is machined so as to provide a cylindrical surface 4 with which anti-friction members may make contact. The race is also provided with a truncated V-shaped groove 5 having walls 6 and 7 which taper inwardly toward each other. This groove extends all the way around the race and is located preferably nearer one end of the race than the other end thereof. Mounted in this groove is a split ring 8 which is so dimensioned that it contacts with the tapered walls 6 and 7. The race is also provided with V-shaped notches 9, 9 at one end thereof and 10, 10 at the other end thereof. These notches lie in a plane extending longitudinally of the race and substantially diametrically of the race. There may be an opening 11 radially disposed through the race midway between the ends thereof and a similar opening 12, at the opposite side of the race. The openings 11 and 12, when employed, are preferably formed in alinement with the notches 9, 9 and 10, 10 respectively.

These notches 9 and 10 may be cut or formed by striking or swaging. The race as described above permits free use of centerless grinding methods for establishing bore and outside diameter and surface finishes. After the race has been finished it is first hardened and then fractured longitudinally. The fracture line is indicated at 15 in Figure 4. This is accomplished by placing the race with the snap ring thereon on an arbor, having a flat surface at the upper side thereof, with the notches centered over the flat surface, placing arbor and race assembly in a restraining block, locating the fixture under a press ram and striking the exposed section with the ram or punch and this will fracture the race at opposed sides along lines extending from the notch at one end of the race to the notch at the other end thereof. The openings 11 and 12, if in the line of fracture, will assist in a fracture but this is not necessary and the openings may be otherwise placed or omitted.

Before the race is fractured the snap ring 8 is placed in the groove and while it will yield to permit fracturing it will hold the fractured parts in mating contact. The primary purpose of this snap ring in the annular external V-groove of the two race segments is to accurately aline the mating segments in an axial direction. If the sections are separated, on reassembly, the snap ring will cause the sections to mate and seat in their original relation to each other. Another purpose of the snap ring is to retain the race sections in assembled position during fracturing operation and subsequent handling and processing and delivery to the user. This snap ring groove is located nearer one end of the race than the other, and this aids the assembler in matching the sections for when the grooves in the section are in alinement the sections are in their original location and the fractured surfaces in mating contact.

The improved race is shown as employing needle rollers 13. The two sections of the race may be disassembled and the needle rollers in the usual manner placed in the half sections or the needle rollers may be placed around the crank shaft. A light grease or petrolatum is used for holding the rollers in place during assembly. The two sections of the race are then applied and the snap ring placed in the groove thereof. After the race has been placed, then the crank shaft assembly can be placed in the engine block. The fractured outer race is clamped between the appropriate bosses in the crank case, securing it and locating the halves diametrically. The snap ring locates the two halves axially.

It is very essential that the outer bearing race be held from shifting. This is accomplished by placing a dowel pin 14 in one of the openings in the race and this dowel pin engages a recess in the engine case 2. The other opening may be used to supply lubrication to the bearing.

While needle rollers are described as used in connection with the race, it will be understood that other types of anti-friction members may be used with very little change in the outer race.

The method of preparing and assembling the improved outer race for anti-friction bearings is described and claimed in my copending application, Serial No. 226,397 filed May 16, 1951.

It is obvious that minor changes may be made in the details of construction without departing from the spirit of the invention as set forth in the appended claims.

I claim:

1. A bearing race consisting of semi-cylindrical sections having mating surfaces formed by fracturing the bearing longitudinally thereof in a substantially diametrical plane, said sections having a circumferential groove with inwardly tapering side walls, and a split ring dimensioned so as to engage said tapered side walls of the grooves at opposed lines of contact for maintaining said sections in axial alignment and in mating contact.

2. A bearing race consisting of semi-cylindrical sections having mating surfaces formed by fracturing the bearing longitudinally thereof in a substantially diametrical plane, said sections having a circumferential groove with inwardly tapering side walls disposed nearer one end than the other, and a split ring dimensioned so as to engage said tapered side walls of the grooves at opposed lines of contact for maintaining said sections in axial alignment and in mating contact.

BYRON T. VIRTUE.

REFERENCES CITED

The following references are of record in the file of this patent:

UNITED STATES PATENTS

| Number | Name | Date |
|---|---|---|
| 1,498,748 | Pierce | June 24, 1924 |

FOREIGN PATENTS

| Number | Country | Date |
|---|---|---|
| 353,594 | Germany | May 23, 1922 |